United States Patent [19]

Nalepa et al.

[11] Patent Number: 5,204,393
[45] Date of Patent: Apr. 20, 1993

[54] THREE-COMPONENT INTUMESCENT FLAME RETARDANT

[75] Inventors: Raymond W. Nalepa, Coventry; Daniel J. Scharf, East Greenwich, both of R.I.

[73] Assignee: Hoechst Celanese Corporation, Somerville, N.J.

[21] Appl. No.: 755,271

[22] Filed: Sep. 5, 1991

[51] Int. Cl.⁵ .......................... C08J 5/10; C08K 5/34; C08L 23/00
[52] U.S. Cl. .................................. 524/101; 524/140; 524/416; 524/492
[58] Field of Search ................ 524/101, 140, 416, 492

[56] References Cited

U.S. PATENT DOCUMENTS

| | | |
|---|---|---|
| 3,671,487 | 6/1972 | Abolins ............................. 260/40 R |
| 3,810,086 | 5/1974 | Mathis et al. ..................... 260/42.45 |
| 3,936,416 | 2/1976 | Brady ............................... 260/42.18 |
| 4,107,232 | 8/1978 | Haaf et al. .......................... 260/876 |
| 4,198,328 | 4/1980 | Bertelli et al. ....................... 524/597 |
| 4,198,493 | 4/1980 | Marciandi ........................... 525/164 |
| 4,344,878 | 8/1982 | Dolce .................................. 524/409 |
| 4,490,504 | 12/1984 | Mark ................................... 524/537 |
| 4,727,102 | 2/1988 | Scarso ................................. 524/200 |
| 4,997,876 | 3/1991 | Scarso ................................. 524/416 |

OTHER PUBLICATIONS

*The Chemistry and Uses of Flame Retardants*, J. Lyons, (Wylie-Interscience, New York, New York, 1970) pp. 256-280.
"Intumescent Coating Systems, Their Development and Chemistry", H. L. Vandersall, *J. Fire & Flammability*, vol. 2, pp. 97-140, (Apr. 1971).
Underwriters' Laboratory Procedure entitled, "Test for Flammability of Plastic Material-UL94".
American Society for Testing Materials ANSI/ASTM D 2863-77, entitled, "Standard Method for Measuring the Minimum Oxygen Concentration to Support Candle-Like Combustion of Plastics (Oxygen Index)", published Sep. 1977 (D 2863).

*Primary Examiner*—Paul R. Michl
*Assistant Examiner*—U. K. Rajguru
*Attorney, Agent, or Firm*—Rosemary M. Miano

[57] ABSTRACT

An improved flame retardant polyolefin is disclosed which comprises a combination of ammonium polyphosphate; tris(2-hydroxyethyl) isocyanurate; and melamine cyanurate; and a selected silica in an amount from 0.5 percent to an amount equal to one-half the amount by weight of THEIC, wherein the selected silica meets defined surface area, particle size and absorption criteria.

13 Claims, No Drawings

THREE-COMPONENT INTUMESCENT FLAME RETARDANT

BACKGROUND OF THE INVENTION

Char forming or intumescent flame retardant compositions are well known in the painting, coating and plastics fields. These systems generally consist of three components: an acid generating component, a char forming component and a blowing agent. The theory and background of such intumescent flame retardant systems are widely reported in the literature; see, for example, *The Chemistry and Uses of Flame Retardants*, J. Lyons, (Wylie-Interscience, New York, N.Y., 1970) pages 256–280; "Intumescent Coating Systems, Their Development and Chemistry", H. L. Vandersall, *J. Fire & Flammability*, Volume 2, pages 97–140, (April, 1971).

Vandersall describes the commercial use of ammonium polyphosphate (APP) as an acid generator, dipentaerythritol (DPE) as a char former, and melamine (ME) as a blowing agent in a system for painting and coating applications. U.S. Pat. No. 3,810,862 to Mathis et al. describes using an APP/DPE/ME system in plastics. U.S. Pat. No. 4,198,493 to Marciandi describes an intumescent flame retardant system for use in paints and plastics in which the polyhydroxy component DPE is replaced by the polyhydroxy compound tris(2-hydroxyethyl) isocyanurate (THEIC).

U.S. Pat. No. 4,727,102 to Scarso discloses a flame retardant polymer composition which appears to be similar to U.S. Pat. No. 4,198,493 and describes one embodiment comprising a mixture of APP, melamine cyanurate (MC) and a hydroxyalkyl derivative of isocyanuric acid wherein the derivative of isocyanuric acid is in the form of a homopolymer. Additionally, U.S. Pat. No. 4,727,102 discloses (see column 2, lines 48–56) a polypropylene polymer containing a two-component flame-retardant additive system consisting of 65% polypropylene, 15% APP and 20% THEIC (based on weight percentages), wherein the polypropylene polymer with the flame-retardant system has a VO, UL94 rating (see explanation of UL94 test and rating method below) with poor mechanical and thermal characteristics.

Flame retardant polymer compositions based upon halogenated organic compounds, phosphorous containing organic compounds, and halogenated organic compounds/antimony oxide mixtures are well known. These systems suffer from several disadvantages, however, that make their use undesirable. The addition of these types of flame-retardant additives to polymers reduces the physical properties of the polymers, such as tensile strength, impact strength, flexural strength and elongation. Additionally, because of environmental and safety factors, it is desirable to get away from systems employing halogenated components.

One of the factors complicating the search for suitable flame retardant additives is the different behavior and properties of the various materials to be rendered flame retardant. This includes the need for different loading levels of flame retardant additives depending on the type of polymer system being considered. For example, polyolefins may require loadings of 30–50 weight percent, polyamides may require loadings of 20–25 weight percent and thermoplastic polyesters may only require loadings of 12–20 weight percent. Depending on the polymer system used and the type and amount of flame retardant used, the physical and mechanical properties of the polymer system may be adversely impacted.

Another problem that has been investigated in this area is the problem of finding suitable drip retardants (also called drip suppressants). It is known that flaming polymer droplets increase the spread of fire and efforts have been made to produce flame retardant polymer compositions which do not exhibit this flame spreading tendency. Many of these attempts at finding drip suppressants have been based on halogenated or phosphorous-organic compound type flame retardant systems, perhaps because the intumescent type of flame retardant systems are generally more drip suppressing than those which are not intumescent.

H. L. Vandersall (at pages 129–130 of the reference discussed above) discloses that the quality of an intumescent foam generated by an intumescent flame retardant system can be improved by the incorporation of finely divided solids into the system. Such particles are believed to assist in the "nucleation" of the foam.

Other references describe improved flame retardant polymer compositions obtained by the use of additives such as fiber glass (see U.S. Pat. No. 4,490,504 to Mark), or polytetrafluoroethylene powder (see U.S. Pat. No. 4,344,878 to Dolce; U.S. Pat. No. 4,107,232 to Haaf, et al; and U.S. Pat. No. 3,671,487 to Abolins). These references describe polymer compositions containing halogen or phosphorous or similar types of materials.

Additionally, problems have been encountered in the processability of polymers to which flame retardants have been added. For example, in flame retardant polymers containing only APP and THEIC two particular processing problems are screw slippage and mold plate-out (also called mold deposit or bloom). THEIC melts at about 140 degrees C, but is incompatible with most polymer systems. Because of its low melt temperature it is believed that the THEIC acts as a plasticizer in the polymer melt. The viscosity of THEIC in such a system is about 1 centipoise. The THEIC migrates to the outside of the melt surface while it is being processed in the extruder. Since the extruder relies on friction of the melt with the metal barrel, and the THEIC reduces the friction between the melt and the metal barrel to almost zero, screw slippage occurs. Also, the migration of THEIC to the surface of the polymer may cause a plate-out of the THEIC on injection molding surfaces. Over time this plate out effect will result in the cessation of molding so that the molds can be cleaned. Additionally, the molded parts themselves may have a sticky or tacky surface. One attempt at solving bloom problems in intumescent flame retardant systems containing APP is described in U.S. Pat. No. 3,936,416 to Brady.

There still remains a need, however, for improved flame retardants which can be added to thermoplastic polymer systems. It is, therefore, an object of this invention to provide improved flame retardants suitable for use in thermoplastic polymer systems, including homopolymers of polyolefins and copolymers, terpolymers, et cetera of one or more polyolefins. It is also an object of this invention to provide flame retardants and polymer systems containing such flame retardants which result in thermoplastics having improved processability, including the reduction of screw slippage, the reduction of mold plate-out, and the reduction of surface bloom problems. It is yet another object of this invention to provide flame retardants and polymer systems containing such flame retardants which result in thermoplastics having good mechanical properties. These and other objects of the invention will become apparent from the description of the invention.

SUMMARY OF THE INVENTION

This invention relates to improved flame retardants and thermoplastic polymer systems formed therewith. The improved flame retardant comprises a combination of an amine/melamine catalyst such as ammonium polyphosphate; a char-forming agent such as tris(2-hydroxyethyl) isocyanurate; a blowing agent such as melamine cyanurate; and a selected silica in an amount from 0.5 percent to an amount equal to one-half the amount by weight of THEIC, wherein a) the total amount of APP, THEIC and MC in the thermoplastic polymer is from about 20 percent to about 50 percent based on the weight of the total flame retardant polymer system; b) the weight ratio of APP to THEIC to MC is from about 2:1:1 to about 7:1:1; and c) the selected silica meets defined surface area, particle size and absorption criteria. Optionally, from 0.5 to about 5.0 percent by weight (based on the weight of the flame retarded thermoplastic resin system) of a pigment selected from the group consisting of $SiO_2$, $TiO_2$, $SnO_2$, ZnO, $Sb_2O_3$, $Fe_2O_3$, $ZnBO_3$ and polytetrafluoroethylene (PTFE) or mixtures thereof may be added. The total amount of pigment and selected silica in the thermoplastic polymer composition is at least 0.5 percent by weight.

DETAILED DESCRIPTION OF THE INVENTION

This invention relates to improved flame retardants and thermoplastic polymer systems formed therewith. The thermoplastic polymers with which the polymer systems are formed are polyolefins, including polyethylene, polypropylene, ethyl vinyl acetate copolymer (EVA), polybutylene, and ethylene ethyl acrylate; such polymers include homopolymers, and blends of two or more polyolefins, and copolymers, terpolymers, et cetera of such polyolefins. Specific examples of such polymers include A) polyethylene, polypropylene, and polybutylene, including homopolymers and copolymers thereof and various types of such polymers (for example, high density, low density); B) a copolymer, terpolymer, et cetera of two or more polymers such as, for example, i) a copolymer made with ethyl vinyl acetate and ethylene, and ii) a crystalline copolymer made with ethylene and propylene; and C) a blend of two or more polymers, for example, polypropylene and polyethylene in any ratio.

The improved flame retardant comprises a combination of a catalyst such as an amine/melamine phosphate, for example and in particular ammonium polyphosphate; a char-forming agent such as tris(2-hydroxyethyl) isocyanurate; a blowing agent such as melamine cyanurate; and at least 0.5 percent of a selected silica characterized as having a surface area (as measured by the BET test) of at least 450 $m^2$/gram; a particle size less than or equal to 4.5 microns; a tapped density (also called bulk density) of less than or equal to 80 grams/liter; and an absorption (as measured by a Dibutyl Phthalate test described below) of at least 330 percent or a Packing Fraction value (test described below) of at least 0.8.

The total amount of the APP/THEIC/MC component in the polymer composition may be from about 20 percent to about 50 percent by weight based on the weight of the final polymer system containing the flame retardant. More particular values for the APP/THEIC/MC component are from 20 percent to 40 percent by weight. The loading level of the APP/THEIC/MC combination should desirably be selected to be at least about 25 percent to about 30 percent based on the weight of the final polymer system. It is believed that this level of loading is necessary to attain a UL94 VO rating. As explained below, a UL94 VO rating is the standard of flame retardancy frequently required by users of flame retarded polymers. A reference describing the VO rating system and other flame retardant ratings is cited below. The ratio of APP to THEIC to MC may be from about 2:1:1 to about 7:1:1, but is preferably around 3:1:1. Thus, based on the weight percent of only these three components, APP may be present in an amount of from about 50% to about 78% percent, and THEIC may be present in an amount of from about 11% to about 25% percent and MC may be present in an amount of from about 11% to about 25% percent by weight based on 100 percent.

The ammonium polyphosphate (APP) used in the invention is a material of formula $(NH_4PO_3)n$ in which n is an integer from about 200 to about 1000 and wherein the APP has a particle size less than 45 microns. An example of an APP useful in the practice of this invention is Exolit® 422 (from Hoechst AG, Frankfurt, Germany), a fine particulate, sparingly water-soluble APP of formula $(NH_4PO_3)_n$, in which n is about 700 and more than 99 percent of the particles are less than 45 microns in size, with a typical average particle size of 19 microns.

The selected silica useful in this invention is a silica such as a precipitated silica which is formed by the reaction of an alkaline silicate solution, preferably sodium silicate, with a mineral acid, such as hydrochloric acid, sulfuric acid, nitric acid. The resulting white precipitate is filtered, washed and dried. The resulting precipitate is then characterized by the following tests and the selected silica is selected on the basis of the values described. The selected silica must have a surface area of at least 450 $m^2$/gram as measured by a test called "BET Surface Area Test" (from Degussa Corporation). The BET Test is done to measure the surface area of silica powders by measuring the quantity of nitrogen gas that absorbs as a monomolecular layer on the surface of a sample. The selected silica must have a particle size that is less than or equal to (that is, does not exceed) 4.5 microns. It is well known in the art how to select particles to ensure that they do not exceed a certain size. These methods include using mesh screens of selected size so as to only allow particles of the chosen size limit to pass through. The selected silica must have a tapped density or bulk density of less than or equal to (that is, does not exceed) 80 grams/liter. Tests used to characterize tapped density or bulk density are well known in the art, for example ASTM D 1895 "Standard Test Methods for Apparent Density, Bulk Factor and Pourability of Plastic Materials". The selected silica must also have a certain oil absorption characteristic. This oil absorption characteristic may be described in several ways, such as by using a Dibutyl Phthalate Absorption Test (DBP Test) to calculate a DBP value, or a Packing Fraction Test (described in Example 3) which uses diatomite and linseed oil to generate an oil absorption value ("Abs"). Of these two tests the DBP test is believed to be more accurate.

An example of a selected silica suitable for use in this invention is FK500LS (Degussa Corporation, Ridgefield Park, N.J.). FK500LS is a precipitated silica having the following typical values: average agglomerate or particle size of 3.5 microns, a pH of 6.5 (5 percent in water), 3 percent moisture (after 2 hours at 1000 degrees), DBP value of 330 percent, and a BET surface area value of 450 m$^2$/gram.

The flame retardant polymer systems of this invention may be used in injection molding, thermoforming, extrusion, blow molding and film applications. Examples of articles which may be made include battery cases, appliance housings, wall panels, electronic parts, wire and cable insulation, and similar types of articles, especially articles where flame retardant qualities are important.

Optionally, a pigment selected from the group consisting of $SiO_2$, $TiO_2$, $SnO_2$, $ZnO$, $Sb_2O_3$, $Fe_2O_3$, $ZnBO_3$ and PTFE, or mixtures thereof, may be added in an amount of from about 0.5 percent to about 5 percent by weight, and preferably in an amount of from about 0.5 percent to about 3.0 percent. Of these pigments, $SiO_2$, $TiO_2$, $SiO_2/TiO_2$, $ZnO$, $Sb_2O_3$, and PTFE are a particular subgroup with $TiO_2$ being the preferred group. It is preferable to use at least one of these additional pigments in the polymer systems of this invention. These particular pigments are believed to enhance the flame retardancy of the polymer systems described in this invention. One can use one pigment selected from the group or a mixture of two or more of these pigments. If mixtures are used, such mixture may be made by using the same or different amounts of the pigments selected. For example, one can use a mixture of one percent $SiO_2$ and one percent $TiO_2$. For example, one can also use 0.5 percent PTFE, 1 percent $SiO_2$ and 1 percent $TiO_2$, and so on.

The compositions of the present invention may also contain dyestuffs, pigments (in addition to those listed above), fillers, fiber-reinforcing agents, lubricants, plasticizers, antistatic agents and stabilizers.

The polymer compositions of the present invention may be prepared by conventional methods known to those skilled in the art. The flame retardant components may be mixed separately and then added to the polymer, or added to the particulate polymer which is mixed to form a uniform blend; the mixture may be melt blended in an extruder and formed into pellets. Alternatively, the blend may also be fed directly to a molding machine such as a screw injection molding machine. Another method includes the formation (for example in a Banbury mixer or extruder) of a master batch in the form of pellets or particles containing a higher concentration of the flame retardant than is desired in the final polymer system. The master batch material may then be blended with more polymer and processed as described above. For a general description of processing plastic materials see *Processing of Thermoplastic Materials*, edited by Ernest C. Bernhardt, Reinhold Publishing Corp., 1967. The flame retardancy of the polymer systems of this invention may be evaluated using the Underwriters' Laboratory Procedure entitled "Test for Flammability of Plastic Material-UL94", such as the one dated May 12, 1975 ("UL94") and American Society for Testing Materials ANSI/ASTM D 2863-77, entitled "Standard Method for Measuring the Minimum Oxygen Concentration to Support Candle-Like Combustion of Plastics (Oxygen Index)", published September, 1977 ("D 2863"). These procedures are incorporated by reference herein.

TEST METHODS

The following DBP and BET test methods have been used by Degussa Corporation in characterizing some of their materials.

DBP Test Method

Approximately 12.50 grams (plus or minus 0.01 g) of sample (such as silica) are weighed out on an analytical balance in an appropriately sized container. The sample is then placed into a mixing head which has been positioned on a Brabender Plasti-Corder ® mixer (model #EPL-V3302, available from C. W. Brabender, Inc., Hackensack, N.J.). Note that all equipment must be completely dry before starting the procedure. The cover is placed over the mixing head and a burette (Constant Rate Burette from Cabot) (calibrated to deliver 4.0 ml/minute of dibutyl phthatlate (DBP)), is properly aligned over the top of the cover, and is filled with dibutyl phthalate (reagent grade from Baker). The mixer is then turned on and checked to be sure that the mixing blades are rotating at exactly 125 revolutions per minute and that the torque reading is zero. The burette is turned on to begin delivery of the DBP and the torque reading is monitored. At a value of 62 newton-meters the burette is turned off and the volume of DBP delivered is recorded (plus or minus 0.01 ml). The DBP Absorption Value (DBP-Abs) can be calculate by using the following equation:

$$DBP\text{-}Abs = \frac{\text{volume of } DBP \text{ used (ml)} \times \text{density of } DBP \times 100}{\text{sample weight of silica (g)}}$$

Alternatively, this information may be furnished in the trade literature for the particular material. For example, Degussa gives this information.

BET Test

The surface area of silica powders may be measured by measuring the quantity of nitrogen gas that adsorbs as a monomolecular layer on the surface of a sample of silica. A sample of silica between 0.05 to 0.15 grams (plus or minus 0.0001 g) is weighed into a tared glass tube with caps (#230/61002/00, from Micromeritics) and the weight of the whole assembly is recorded. The caps are then removed and the glass sample tube is placed into the metal sample holder of a Flowsorb II 2300 ® instrument (Micromeritics Instrument Corporation, Norcross Springs, Ga.) and plugged into the DEGAS outlet. The empty sample tube and holder assembly are on the TEST outlet. A heating mantle is placed over the holder assembly containing the sample and the heater is set to a temperature of 160 degrees C. for 20 minutes. When completed, the holder assemblies are reversed so that the holder containing the sample is now located in the TEST outlet. The gas flow is readjusted to 62 if necessary. The liquid nitrogen in the cold trap Dewar flask is initially full. The DET button is then depressed. The instrument will count the air pulse and then return to a value of 0.02 or less. The Dewar of liquid nitrogen is then placed under the sample. The sample is immersed by lifting up the Dewar tray until it locks with a click. After the DET display returns to 0.02 or less, the CLEAR S.A. DISPLAY button is pushed. The SURFACE AREA button is then pushed so that the display reads 0.00. Then the RELEASE button is pushed and the liquid nitrogen is removed. The sample is warmed with a beaker of water. The gas flow returns to the line and the THRESHOLD light begins blinking. Counting will appear on the digital display. After the counting stops, the SURFACE AREA button is pushed and the result on the display is read. The surface area (in square meter/gram) may be calculated by using the following equation.

$$\text{Surface area} = \frac{\text{final display value (square meter)}}{\text{sample weight (g)}}$$

Alternatively, this information may sometimes be obtained from the supplier of material.

EXAMPLES

The following nonlimiting examples are intended to be illustrative of the invention. Unless otherwise indicated, chemical symbols have their usual meaning, C means degrees Centigrade, g means grams, ml means milliliter, M-g means meter-gram, mm means millimeter, PTFE means polytetrafluoroethylene.

EXAMPLE 1

Polypropylene (40.2 g of Profax 6323); APP (12.0 g of Exolit® 422); THEIC (3.0 g); titanium dioxide pigment (0.6 g of R101 from DuPont); talc (Vertal 1500 from Cyprus Industrial Minerals Company, Englewood, Colo.) and melamine cyanurate (3.0 g) were combined by hand in a 150 ml plastic beaker. The materials were then compounded using a Brabender torque rheometer fitted with a Banbury type mixer. The materials were compounded at 170 to about 190 degrees C and mixed until the torque reached a constant value of about 5 M-g. The polymer melt was then removed from the mixer and put into a compression mold (ANCO TOOL, East Providence, R.I.) having a cavity 5 inches by 5 inches by 1/16 inch (127 mm by 127 mm by 1.6 mm) with a highly polished surface. The mold was pressed using a hydraulic press having flat horizontal platens (Carver press) with heated surfaces at 170-190 degrees C. The mold was then removed and put in a Carver press with a water-cooled surface. The mold was left in this press under about 10,000 pounds of pressure (45,000 newtons) for about 5 minutes and then removed. The plates were then separated and the resulting plastic film was peeled from the plate. The residue remaining on the stainless steel polished surface was then noted. The results of material made in this Example 1 was compared to a standard known as "30 percent IFR10". This IFR 10 standard was made by mixing APP, THEIC and melamine cyanurate in a ratio of 3:1:1. Thirty percent means 30 percent by weight of this mixture.

This rating system is a subjective assessment which generally follows the following criteria. A rating of 5 to 6 is equivalent to a dull waxy appearance on the entire face of the polished mold. This deposit is thin but covers the entire surface of the mold. A rating of zero would be given to a surface showing no deposit at all on the polished surface. A rating between zero and six would be given if the surface had a deposit that covered only portions of the surface but not the entire surface. (The higher the amount of surface covered, the closer the value would be toward 6). A rating of greater than 6 would be used for surfaces having a thicker layer of deposit covering the entire surface of the mold. A reading of between 0 and 3 is preferred with a zero rating being the best rating.

EXAMPLE 2

The procedure described in Example 1 was repeated except that 1.8 g of talc (Supra A from Cyprus Industrial Minerals Company) was used instead of the Vertal 1500.

EXAMPLES 1-2: RATINGS

The appearance of the plates resulting from the procedures described for Examples 1 and 2 were evaluated by rating the appearance of the plates, with 0 equal to no plate out and 10 equal to the worst plate out. Example 1 had a rating of 7.0. Example 2 had a rating of 7.0.

EXAMPLE 3

Diatomaceous earth (also called diatomite) (5 g Celatom MW27 from Eagle Picher Inc., Reno, Nev. were placed on a flat black formica laminated plastic sheet. Drops (enough to give a glaze) of linseed oil from a pipette were slowly dripped onto the powder. After every few drops the oil was worked into the powder using a spatula. This process was continued until a glaze was noted on the surface of the powder/oil blend. The presence of such a glaze indicated the end point at which all the oil that could be absorbed into the powder has been absorbed into the powder. The volume of oil absorbed (Abs) is represented by the following formula:

$$Abs = \frac{(Vb - Vf)}{(W/sg) + (Vb - Vf)}$$

where Vb equals the beginning volume of linseed oil in the pipette, Vf equals the final volume of linseed oil in the pipette, W equals the weight of the powder in grams and sg equals the specific gravity of the powder in g/cc. This test may also be used with silica samples.

EXAMPLE 4

A polymer was made using the method described in Example 1, but with the following materials and amounts instead of those listed in Example 1: 71 g of polypropylene, 15 g of APP (Exolit® 422), 5 g of THEIC, 5 g of melamine cyanurate, 1 g of PTFE and 3 g of silica (type FK500LS from Degussa Corporation). The procedure described in Example 1 was followed up through the removal of the plastic film as a plaque. The plaque was cut into strips which measured 5 inches by ½ inch (127 mm by 12.7 mm) using a Twing Albert film cutter. These strips were then used for testing in the Underwriters' Laboratory vertical test cabinet described in UL94 and in the Oxygen Index apparatus described in ASTM test D 2863. The UL94 rating was V2.

EXAMPLES 5-10

The method of Example 4 was repeated using the amounts of materials shown in Table I. The results of the UL94 rating for each of these materials is also shown in Table I.

TABLE 1

| Example Number | Polymer Used and Amount | Amount of APP* Used | Amount of THEIC Used | Amount of MC Used | Amount of FK500LS Silica | Pigment Used and Amount | UL94 Rating |
| --- | --- | --- | --- | --- | --- | --- | --- |
| 5 | Polypropylene 71 g | 15 g | 5 g | 5 g | 3 g | TiO$_2$ 1 g | V0 |
| 6 | Polypropylene 67 g | 18 g | 6 g | 6 g | 3 g | none | V0 |
| 7 | Polypropylene 71 g | 15 g | 5 g | 5 g | 3 g | Sb$_2$O$_3$ 1 g | V2 |
| 8 | Polypropylene 66 g | 18 g | 6 g | 6 g | 3 g | none | V0 |
| 9 | Polypropylene 62 g | 21 g | 7 g | 7 g | 3 g | none | V2 |
| 10 | Polypropylene 66 g | 18 g | 6 g | 6 g | 3 g | Sb$_2$O$_3$ 1 g | V0 |

*APP = Exolit ® 422

EXAMPLE 11

A polymer was made using the method described in Example 1, but with the following materials and amounts instead of those listed in Example 1: 74 g of polypropylene, 15 g of APP (Exolit® 422), 5 g of THEIC, 5 g of melamine cyanurate and 1 g of PTFE. The polymer was compounded as described in Example 1 and a film was made as described in Example 1. The residue remaining on the stainless steel polished surface was noted using the rating system described in Example 1. The rating for the surface after making the film as described in this Example 11 was 8.

EXAMPLES 12-17

The procedure described in Example 11 was repeated except that the types and amounts of materials listed in Table II were used instead of the amounts listed in Example 11. Data for surface appearance evaluations using the rating system described in Example 1 is also given in Table II. Polypropylene was the polymer used in each of Examples 12-17 and Exolit® 422 was the type of APP used.

TABLE II

| Example Number | Amount of Polypropylene Used | Amount of APP* Used | Amount of THEIC Used | Amount of MC Used | Type and Amount of Silica Used | Type and Amount of Other Additive Used | Plate Out Rating (0 = none, 10 = worst) |
| --- | --- | --- | --- | --- | --- | --- | --- |
| 12 | 75 g | 15 g | 5 g | 5 g | none | none | 6 |
| 13 | 63 g | 21 g | 7 g | 7 g | FK500LS 2 g | none | 1.5 |
| 14 | 61.9 g | 21 g | 7 g | 7 g | FK500LS 3.1 g | none | 0 |
| 15 | 72 g | 15 g | 5 g | 5 g | none | Vertal* 1500 3 g | 7 |
| 16 | 72 g | 15 g | 5 g | 5 g | none | Supra A* 3 g | 7 |
| 17 | 72 g | 15 g | 5 g | 5 g | FK500LS 3 g | none | 0 |

*Supra A and Vertal 1500 are each = TALCS

What we claim is:

1. A flame retardant polyolefin wherein the flame retarding portion of the polyolefin comprises ammonium polyphosphate, tris(2-hydroxyethyl) isocyanurate, melamine cyanurate, and a selected silica, wherein:
   a) the ammonium polyphosphate is a compound of formula (NH$_4$PO$_3$)$_n$ in which n is an integer from about 200 to about 1000 and has a particle size less that 45 microns;
   b) the total amount of ammonium polyphosphate, tris(2-hydroxyethyl) isocyanurate, and melamine cyanurate in the polyolefin is from about 20 percent to about 50 percent by weight;
   c) the ratio of ammonium polyphosphate to tris(2-hydroxyethyl) isocyanurate to melamine cyanurate is from about 2:1:1 to about 7:1:1; and
   d) said selected silica is added in an amount of from 0.5 percent by weight to an amount equal to one-half the amount by weight of said tris(2-hydroxyethyl) isocyanurate and wherein said selected silica has a surface area of at least 450 m$^2$/gram, a particle size less than or equal to 4.5 microns, a tapped density of less than or equal to 80 grams/liter and a dibutyl phthalate absorption value of at least 330 percent.

2. A flame retardant polyolefin as claimed in claim 1 wherein the polyolefin is selected from the group consisting of polyethylene, polypropylene, ethyl vinyl acetate copolymer, polybutylene, and ethylene, copolymers or terpolymers of said polyolefins, and blends of two or more of said polyolefins.

3. A flame retardant polyolefin as claimed in claim 1 wherein the total amount of ammonium polyphosphate, tris(2-hydroxyethyl) isocyanurate and melamine cyanurate in the polyolefin is from about 20 percent to about 40 percent by weight.

4. A flame retardant polyolefin as claimed in claim 1 wherein the total amount of ammonium polyphosphate, tris(2-hydroxyethyl) isocyanurate, and melamine cyanurate in the polyolefin is from about 25 percent to about 30 percent by weight.

5. A flame retardant polyolefin as claimed in claim 1 wherein the ratio of ammonium polyphosphate to tris(2- hydroxyethyl) isocyanurate to melamine cyanurate is about 3:1:1.

6. A flame retardant polyolefin as claimed in claim 1 wherein said flame retarded polyolefin additionally contains from about 0.5 percent to about 5 percent by weight of a pigment selected from the group consisting of $SiO_2$, $TiO_2$, $SnO_2$, ZnO, $Sb_2O_3$, $Fe_2O_3$, $ZnBO_3$, poytetrafluoroethylene, and mixtures thereof.

7. A flame retardant polyolefin as claimed in claim 6 wherein said pigment is from about 0.5 percent to about 3 percent by weight.

8. A flame retardant polyolefin as claimed in claim 6 wherein said pigment is selected from the group consisting of $SiO_2$, $TiO_2$, $SiO_2/TiO_2$, ZnO, $Sb_2O_3$ and polytetrafluoroethylene.

9. A flame retardant polyolefin as claimed in claim 6 wherein said pigment is $TiO_2$.

10. A method for producing a flame retardant polyolefin comprising the steps of combining:
   a) a polyolefin selected from the group consisting of polyethylene, polypropylene, ethyl vinyl acetate copolymer, polybutylene, and ethylene, copolymers or terpolymers of said polyolefins, and blends of two or more of said polyolefins; and
   b) ammonium polyphosphate, tris(2-hydroxyethyl) isocyanurate and a selected silica, wherein:
      i) the ammonium polyphosphate is a compound of formula $(NH_4PO_3)_n$ in which n is an integer from about 200 to about 1000 and has a particle size less that 45 microns;
      ii) the total amount of ammonium polyphosphate, tris(2-hydroxyethyl) isocyanurate, and melamine cyanurate in the polyolefin is from about 20 percent to about 50 percent by weight;
      iii) the ratio of ammonium polyphosphate to tris(2-hydroxyethyl) isocyanurate to melamine cyanurate is from about 2:1:1 to about 7:1:1; and
      iv) said selected silica is added in an amount of from 0.5 percent by weight to an amount equal to one-half the amount by weight of said tris(2-hydroxyethyl) isocyanurate and wherein said selected silica has a surface area of at least 450 $m^2$/gram, a particle size less than or equal to 4.5 microns, a tapped density of less than or equal to 80 grams/liter and a dibutyl phthalate absorption value of at least 330 percent.

11. The method as claimed in claim 10 further comprising adding from about 0.5 percent to about 5 percent by weight of a pigment selected from the group consisting of $SiO_2$, $TiO_2$, $SnO_2$, ZnO, $Sb_2O_3$, $Fe_2O_3$, $ZnBO_3$, poytetrafluoroethylene, and mixtures thereof.

12. A flame retardant article made from the flame retarded polyolefin of claim 1.

13. A flame retardant article made from the flame retarded polyolefin of claim 6.

* * * * *